United States Patent [19]
Bush et al.

[11] Patent Number: 6,020,913
[45] Date of Patent: Feb. 1, 2000

[54] EMERGENCY ALERT SYSTEM SIGNAL HANDLING METHOD AND APPARATUS

[75] Inventors: Terry W. Bush, Greenwood; James E. Harris; Daniel M. O'Connor, both of Indianapolis, all of Ind.

[73] Assignee: Trilithic, Inc., Indianapolis, Ind.

[21] Appl. No.: 08/840,394

[22] Filed: Apr. 29, 1997

[51] Int. Cl.$^7$ ................................................ H04N 7/16

[52] U.S. Cl. .................................. 348/9; 348/705; 348/6; 307/113

[58] Field of Search ........................... 348/9, 460, 705, 348/484, 563, 564, 473, 6, 8, 10, 11, 12, 13; 453/6.3, 6.2, 4.2, 5.1; 361/160, 191; 307/131, 132 R, 132 E, 113; H04N 7/18, 7/16

[56] References Cited

U.S. PATENT DOCUMENTS

| | | | |
|---|---|---|---|
| 3,860,746 | 1/1975 | Takeuchi | 348/9 |
| 3,891,792 | 6/1975 | Kimura | 348/622 |
| 3,975,583 | 8/1976 | Meadows | 348/460 |
| 4,015,074 | 3/1977 | Inoue et al. | 348/9 |
| 4,155,042 | 5/1979 | Permut et al. | 455/38.4 |
| 4,331,973 | 5/1982 | Eskin et al. | 348/13 |
| 4,331,974 | 5/1982 | Cogswell et al. | 348/9 |
| 4,439,784 | 3/1984 | Furukawa et al. | 348/6 |
| 4,476,488 | 10/1984 | Merrell | 348/9 |
| 4,616,214 | 10/1986 | Naito | 358/86 |
| 4,658,290 | 4/1987 | McKenna et al. | 348/1 |
| 4,887,152 | 12/1989 | Matsuzaki et al. | 348/8 |
| 5,027,208 | 6/1991 | Dwyer et al. | 348/516 |
| 5,027,211 | 6/1991 | Robertson | 348/516 |
| 5,121,430 | 6/1992 | Ganzer et al. | 380/48 |
| 5,140,419 | 8/1992 | Galumbeck et al. | 348/465 |
| 5,260,778 | 11/1993 | Kauffman et al. | 348/6 |
| 5,495,283 | 2/1996 | Cowe | 348/9 |

OTHER PUBLICATIONS

Dynatech Cable Products Group, ACM, All Channel Message System, Operations Manual, Jun. 24, 1992 Revision 3.
Quanta Corporation, QCG–38 Specifications, 2 pages, date is unascertainable.
Chyron Corporation, The Chyron ACG, A product of The Chyron Group, brochure, 1989, 2 sheets, 4 pages.
TV Technology, Frontline Develops Digital EAS by Lauren Rooney, newspaper article, Apr. 24, 1997.
TV Technology, CG Design and Application by Dennis Hamilton, newspaper article, Apr. 24, 1997.
Laird Telemedia Inc., Price List—Apr. 1, 1988, Graphics Products, 2 pages.
Laird The Telemedia Company, brochure, Mar. 1988, 4 sheets, 7 pages.
Quanta Pocket Price List, Effective Apr. 28, 1989, 2 pages.
Comments of the Society of Cable Television Engineers, Before the Federal Communications Commission, Washington, D.C. 20554, Jan. 15, 1993.

*Primary Examiner*—Michael H. Lee
*Assistant Examiner*—Jean W. Désir
*Attorney, Agent, or Firm*—Barnes & Thornburg

[57] ABSTRACT

A communication system includes a transmission channel, a relay having first and second states, an operating power port, a first signal input port, a second signal input port and a signal output port. A power supply supplies power to the relay to place the relay alternately in the first and second states. The system further comprises first and second sources of program material to be selectively and alternately transmitted in the channel. The first and second sources of program material are characterized by at least one program material frequency. The first signal input port of the relay is coupled to the first source of program material. The signal output port of the relay is coupled to the transmission channel. A first inductance is provided for coupling the power supply to the operating power port. The relay includes a second inductance coupled across the power port for controlling the relay's state. First and second capacitances are provided for coupling the second source of program material to the second signal input port.

21 Claims, 4 Drawing Sheets

EMERGENCY ALERT SYSTEM SIGNAL HANDLING METHOD AND APPARATUS

This invention relates to an improved method and apparatus for handling emergency alert system (EAS) signals at a CATV (cable television) head end.

Governments typically mandate that emergency alert facilities be made available by, among others, licensed communications carriers such as broadcasters, CATV system operators, and the like. In the U.S., for example, many FCC licensed carriers must provide emergency alert system (EAS) compatibility to permit the transmission on licensed channels of emergency information in the event of for example, natural catastrophe, such as earthquake, flood, fire, or the like. In the past, fairly complex suites of equipment have been required to respond to this mandate.

The following listed U. S. patents illustrate a number of different methods and apparatus for displaying messages of various types, including emergency messages, on video displays: U.S. Pat. Nos. 3,891,792; 3,975,583; 4,331,973; 4,658,290; 4,887,152; 5,027,208; 5,027,211; 5,140,419; 5,260,778; and, 5,495,283. No representation is intended by this listing that a thorough search of all relevant prior art has been conducted, or that no better prior art than that listed here exists. Nor should any such representation be inferred.

According to one aspect of the invention, a communication system includes a transmission channel, a relay having first and second states, an operating power port, a first signal input port, a second signal input port and a signal output port. A power supply supplies power to the relay to place the relay alternately in the first and second states. The system further comprises first and second sources of program material to be selectively and alternately transmitted in the channel. The first and second sources of program material are characterized by at least one program material frequency. The first signal input port of the relay is coupled to the first source of program material. The signal output port of the relay is coupled to the transmission channel. A first inductance is provided for coupling the power supply to the operating power port. The relay includes a second inductance coupled across the power port for controlling the relay's state. First and second capacitances are provided for coupling the second source of program material to the second signal input port.

Illustratively according to this aspect of the invention, the first and second inductances comprise first and second inductances which provide a relatively higher impedance path to the program material frequency and a relatively lower impedance path to the power supply.

Additionally illustratively according to this aspect of the invention, the first and second capacitances comprise first and second capacitances which provide a relatively higher impedance path to the power supply and a relatively lower impedance path to the program material frequency.

Further illustratively according to this aspect of the invention, a switch which is at least an analog switch has a main current-conducting path and first, relatively more conductive and second, relatively less conductive states. The main current-conducting path is coupled in series between the power supply and the first inductance. The supply of power to the operating power port of the relay is controlled by the state of the switch.

Additionally illustratively according to this aspect of the invention, a microcomputer is coupled to the switch. The microcomputer controls the state of the switch.

Further illustratively according to this aspect of the invention, the first inductance is coupled in series between the power supply and the operating power port.

Illustratively according to this aspect of the invention, the first capacitance is coupled in series between the second source of program material and the operating power port of the relay.

Further illustratively according to this aspect of the invention, the second capacitance is coupled in series between the first capacitance and the first inductance on the one hand and the second signal input port on the other hand.

Illustratively according to this aspect of the invention, a conductor is coupled to the first inductance, the second inductance, the first capacitance, and the second capacitance so that the conductor is adapted for simultaneously carrying the program material of the second program material source and the power to change the state of the relay.

Illustratively according to this aspect of the invention, the second program signal is an Emergency Alert System (EAS) program signal and the first program signal is a non-EAS program signal.

Additionally illustratively according to this aspect of the invention, the EAS program signal contains EAS baseband video and separate EAS baseband audio.

A communication system according to this aspect of the invention illustratively includes a modulator having an IF loop and an output port. The output port of the modulator is coupled to the transmission channel and the IF loop of the modulator is coupled to the first signal input port and the signal output port of the relay.

According to another aspect of the invention, a method for switching between first and second sources of program material to be alternately transmitted in a transmission channel includes providing the transmission channel, providing the first source of program material, providing the second source of program material, providing a relay having two states, an operating power port, a first signal input port, a second signal input port, and a signal output port, and providing a power supply for operating the relay. The first signal input port is coupled to the first source of program material. The signal output portis coupled to the transmission channel. The power supply is coupled through a first inductance to a second inductance included in the relay for controlling the relay state. The second source of program material is coupled to the second signal input port through first and second capacitors. Power is coupled to the second inductance to switch the relay from a first state in which the first source of program material is transmitted in the channel to a second state in which the second source of program material is transmitted in the channel.

The invention may best be understood by referring to the following detailed description and accompanying drawings which illustrate the invention. In the drawings.

Figure 1:
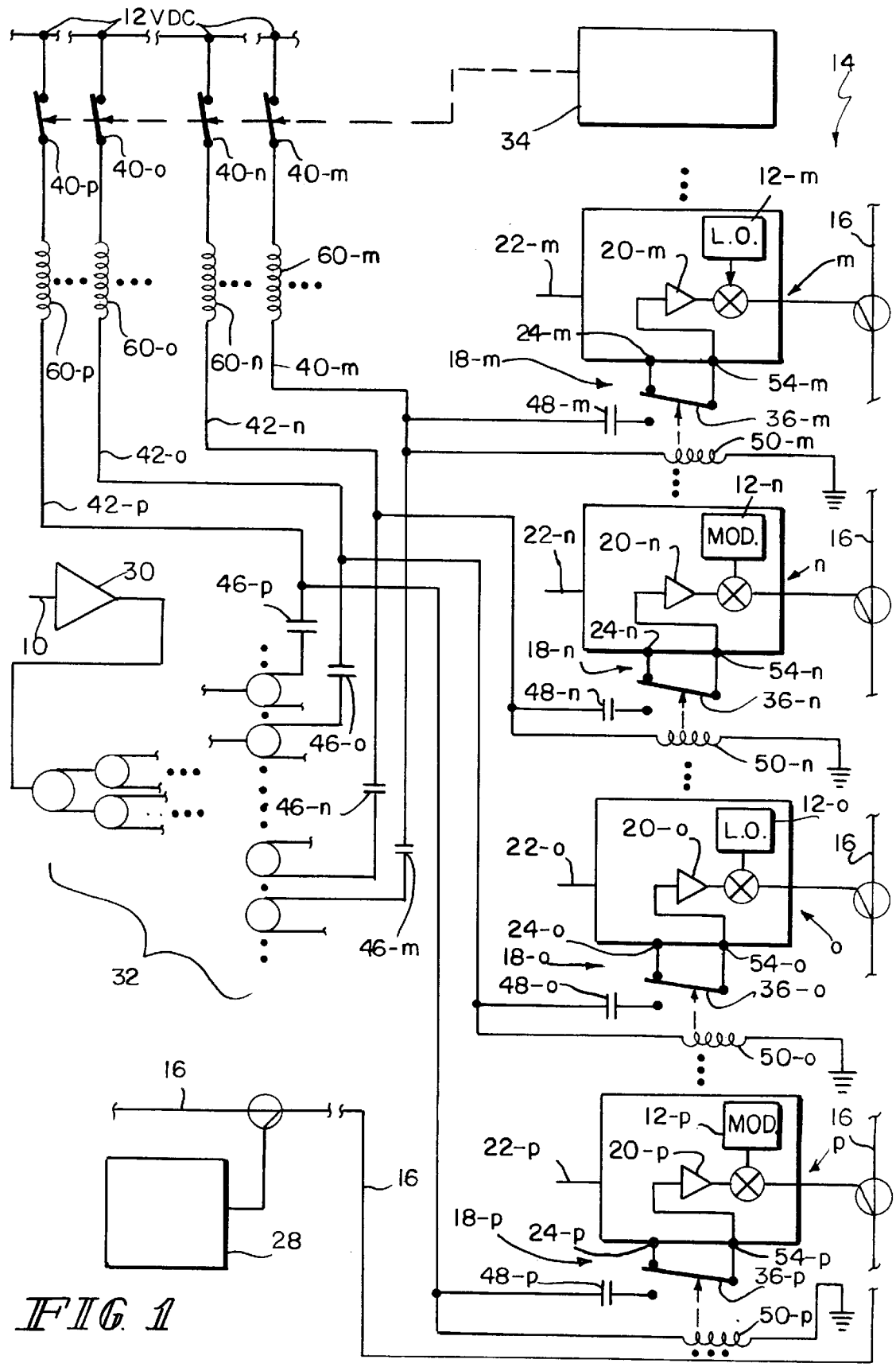
FIG. 1 illustrates a simplified, partly block and partly schematic diagram of a fragment of a CATV system head end incorporating the invention.

FIG. 1 illustrates a source 10 of EAS program material at a suitable intermediate frequency (IF) to be mixed with the output of the local oscillator (LO) or channel modulator . . . 12-*m*. . . 12-*n*, . . . 12-*o*, . . . 12-*p* . . . which will modulate the EAS IF 10 up or down to a CATV system 14 carrier frequency to be placed onto the CATV system "cable" 16. Usually the EAS IF feed will be to the so-called IF loop . . . 18-*m*, . . . 18-*n*, . . . 18-*o*, . . . 18-*p*, . . just prior to amplifying . . . 20-*m*, . . . 20-*n*, . . . 20-*o*, . . . 20-*p* . . . and modulating . . . 12-*m*, . . . 12-*n*, . . . 12-*o*, .12-*p*, . . . program material onto the channel carrier.

In a typical CATV system 14, there are a number ... 22-*m*, . . . 22-*n*, . . . 22-*o*, . . . 22-*p*, . . . of program material sources. For example, some one or more program material sources . . . 22-*m*, . . . 22-*n*, . . . 22-*o*, . . . 22-*p* . . . are local television stations whose signals may be received via conventional antennas, cable feeds from such stations, or the like, appropriately converted to IF and then supplied to the input terminals . . . 24-*m*, . . . 24-*n*, . . . 24-*o*, . . . 24-*p*, . . . of some one or more IF loops . . . 18-*m*, . . . 18-*n*, . . . 18-*o*, . . . 18-*p*, . . . , amplified as necessary, up- or down-converted as necessary by some one or more suitable local oscillators, modulators, or the like, and placed onto the cable 16.

The same, or other suitable techniques are used for program material from other sources . . . 22-*m*, . . . 22-*n*, . . . 22-*o*, . . . 22-*p*, . . . such as satellite transmissions, video tape or video cassette players, and so on, with the objective being the same, that is making the program material . . . 22-*m*, . . . 22-*n*, . . . 22-*o*, . . . 22-*p*, . . . modulated by some suitable carrier . . . 12-*m*, . . . 12-*n*, . . . 12-*o*, . . . 12-*p*, . . . available to cable subscribers for demodulation and viewing by those subscribers or their television receivers 28.

According to the invention, the EAS IF 10 is amplified by some one or more amplifiers 30, illustrated as a single amplifier for clarity, having suitable gain to, for example, split the EAS IF signal 10 a sufficient number of times using splitters 32 to provide feed to each IF loop . . . 18-*m*, . . . 18-*n*, . . . 18-*o*, . . . $^{18}$-p, . . . in the system 14.

The EAS IF 10 feed to the IF loops . . . 18-*m*, . . . 18-*n*, . . . 18-*o*, . . . 18-*p*, . . . is controlled by, for example, a microcomputer 34 which monitors some one or more emergency conditions and switches . . . 36-*m*, . . . 36-*n*, . . . 36-*o*, . . . 36-*p*, . . . the IF loops . . . 18-*m*, . . . 18-*n*, . . . 18-*o*, . . . 18-*p* , . . . of all of the CATV channels . . . m, . . . , n, . . . o, . . . p, . . . to the EAS IF feed 10. The EAS IF signal 10 is thereby substituted for the normal program material . . . 22-*m*, . . . 22-*n*, . . . 22-*o*, . . . 22-*p* . . . IF, and goes out on all channels . . . m, . . . n, . . . o, . . . p, . . . of the cable 16 for viewing by subscribers.

Illustratively, the computer 34 controls the condition of a logic controlled voltage source . . . 40-*m*, . . . 40-*n*, . . . 40-*o*, . . . 40-*p*, . . . associated with each IF loop . . . 18-*m*, . . . 18-*n*, . . . 18-*o*, . . . 18-*p*, . . . . These sources are illustrated as switches 40-*m*, . . . 40-*n*, . . . 40-*o*, . . . 40-*p* for purposes of explanation, but any device, such as a TTL driver, which serves to control the supply of voltage would be suitable. The normally open contacts of the switch close, supplying 12 VDC to a section . . . 42-*m* . . . 42-*n*, . . . 42-*o*, . . . 42-*p*, . . . of the EAS system associated with each channel . . . m, . . . n, . . . o, . . . p, . . . . This section . . . 42-*m*, . . . 42-*n*, . . . 42-*o*, . . . 42-*p*, . . . is isolated at both ends from the IF path by DC blocking capacitors . . . 46-*m*, 48-*m*, . . . 46-*n*, 48-n, . . . 46-*o*, 48-*o*, . . . 46-*p*, 48-*p*, . . . , respectively. The 12 VDC powers a relay coil . . . 50-*m*, . . . 50-*n*, . . . 50-*o*, . . . 50-*p*, . . . associated with each IF switch . . . 36-*m*, . . . 36-*n*, . . . 36-*o*, . . . 36-*p*, . . . , the normally closed contacts of which provide the normal program material . . . 22-*m*, . . . 22-*n*, . . . 22-*o*, . . . 22-*p*, . . . IF to the IF loop output terminals . . . 54-*m*, . . . 54-*n*, . . . 54-*o*, . . . 54-*p*, . . . . However, in the event of an EAS broadcast, the computer 34 closes the switches . . . 40-*m*, . . . 40-*n*, . . . 40-*o*, . . . 40-*p*, . . . and provides 12 VDC to the relay coils . . . 50-*m*, . . . 50-*n*, . . . 50-*o*, . . . 50-*p*, . . . , switching . . . 36-*m*, . . . 36-*n*, . . . 36-*o*, . . . 36-*p*, . . . the relays and providing simultaneous paths for the EAS IF 10 to be modulated with all cable channel modulators, local oscillators, and the like . . . 12-*m*, . . . 12-*n*, . . . 12-*o*, . . . 12-*p*, . . . .

Illustratively, an inductor . . . 60-*m*, . . . 60-*n*, . . . 60-*o*, . . . 60-*p*, . . . blocks the EAS IF 10 from the 12 VDC supply, so as not to degrade the EAS IF 10. At the IF loop end of the section . . . 42-*m*, . . . 42-*n*, . . . 42-*o*, . . . 42-*p*, . . . , the EAS IF 10 is blocked by the inductance of the relay coil . . . 50-*m*, . . . 50-*n*, . . . 50-*o*, . . . 50-*p*, . . . , so as not to degrade the EAS IF 10. The EAS IF 10 passes substantially unattenuated through the DC blocking capacitors . . . 46-*m*, 48-*m*, . . . 46-*n*, 48-*n*, . . . 46-*o*, 48-*o*, . . . 46-*p*, 48-*p*, . . . at both ends of the section . . . 42-*m*, . . . 42-*n*, . . . 42-*o*, . . . 42-*p*, . . . and is available at substantially full gain at the respective buffer amplifier . . . 20-*m*, . . . 20-*n*, . . . 20-*o*, . . . 20-*p*, . . . .

Figure 2:
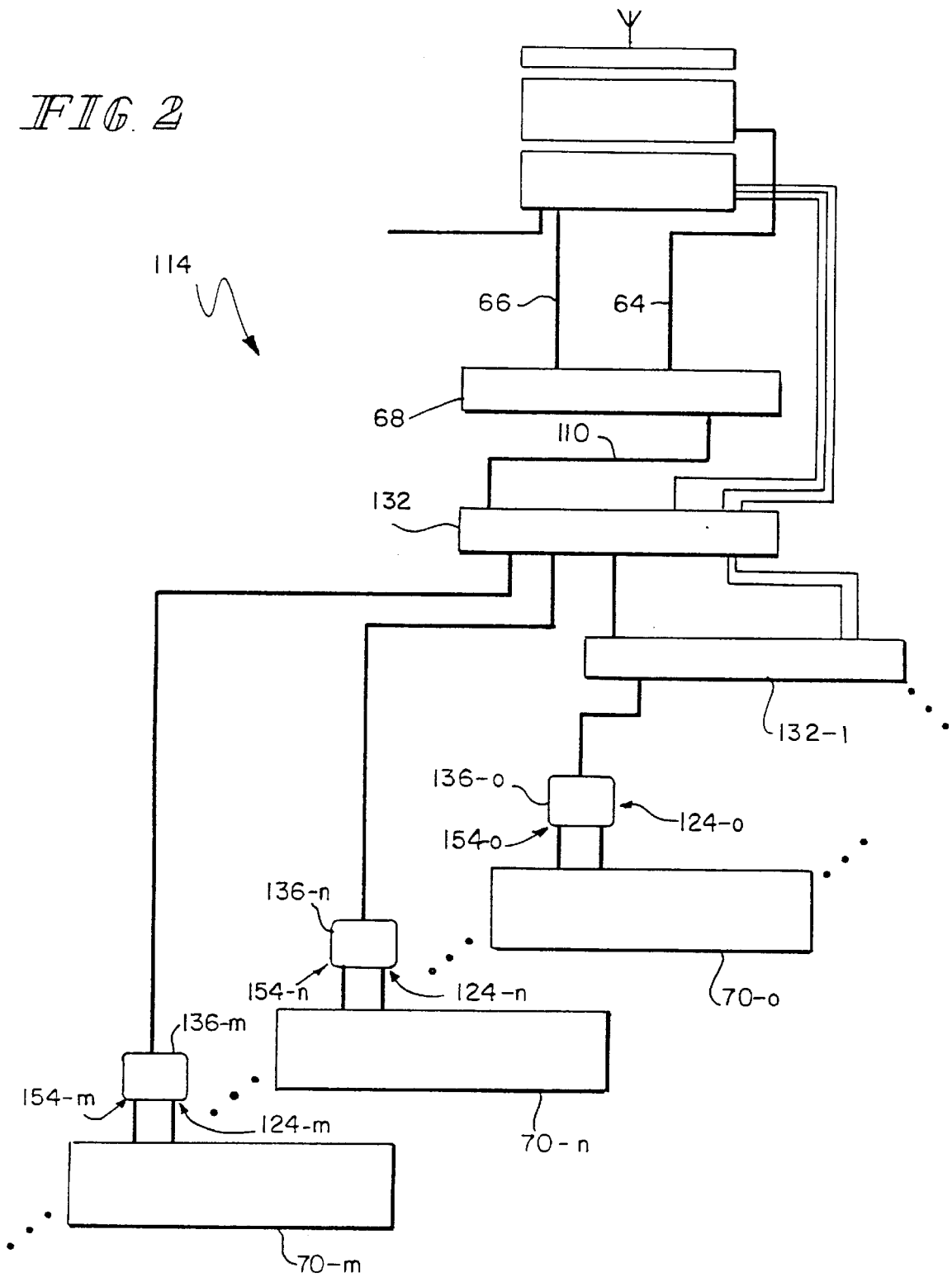
FIG. 2 illustrates a block diagram of a fragment of a CATV system head end incorporating the invention.

Referring now to FIG. 2, a system is illustrated incorporating relay switches of the type illustrated in FIG. 1. Alert station audio, typically AM and/or FM NOAA baseband audio 64 plus baseband video 66 is combined and up-converted in, for example, a Trilithic model IFS-1 IF modulator 68. The resulting EAS IF 110 is provided to a splitter 132 such as, for example, a Trilithic LS-16 or LS-16P 1-to-16 splitter. The output ports of the splitter 132 are coupled through, for example, suitable coax cables and connectors to normally open EAS IF input terminals of relay switches . . . 136-*m*, . . . 136-*n*, . . . which illustratively are Trilithic model SW-1 RF switches. The normally closed terminals . . . 124-*m*, 154-*m*, . . . 124-*n*, 154-*n*, . . . 124-*o*, 154-*o*, . . . of relay switches . . . 136-*m*, . . . 136-*n*, . . . 136-*o*, . . . are coupled to the IF output and IF input ports, respectively, of conventional composite IF modulators . . . 70-*m*, . . . 70-*n*, . . . 70-*o*, . . . , one, 70-*m*, of which may be an "EAS designated" channel of the CATV system 114 that carries NOAA programming substantially full time. If necessary, some one or more of the output ports of the splitter 132 may be coupled to (an) input port(s) of one or more additional splitters 132-1, . . . to provide additional EAS IF sources for additional composite IF modulators . . . 70-*o*, . . . .

Figure 3:
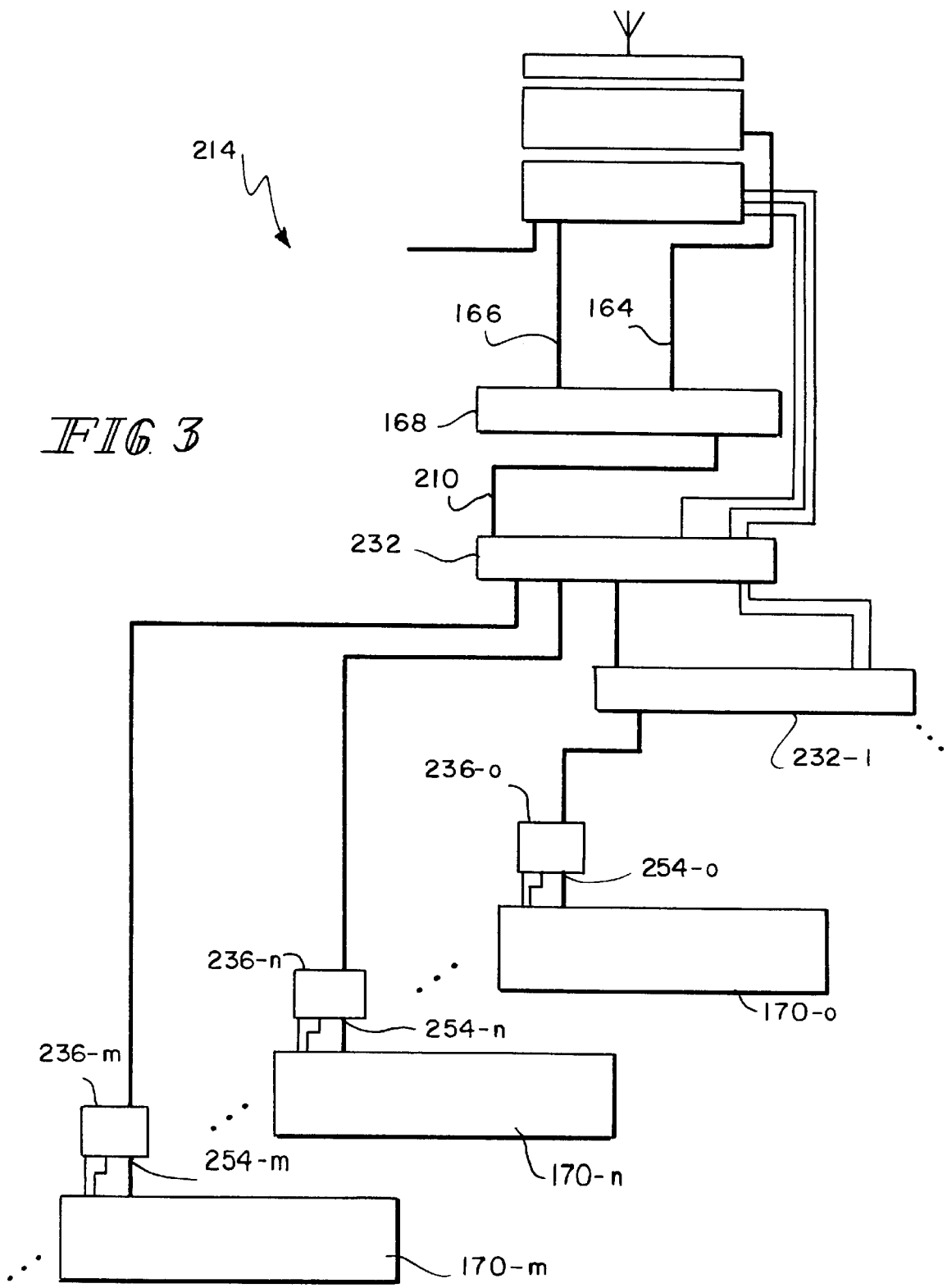
FIG. 3 illustrates a block diagram of a fragment of a CATV system head end incorporating the invention.

Referring now to FIG. 3, another system is illustrated incorporating relay switches. Alert station audio, typically AM and/or FM NOAA baseband audio 164 and baseband video 166 are combined and up-converted in, for example, a Trilithic model IFS-1 IF modulator 168. The resulting EAS IF 210 is provided to a splitter 232 such as, for example, a Trilithic LS-16 splitter. The output ports of the splitter 232 are coupled through, for example, suitable coax cables and connectors to EAS IF input terminals of relay switches . . . 236-*m*, . . . 236-*n*, . . . which illustratively are Trilithic model SW-4 RF switches. The EAS IF output terminals . . . 254-*m*, . . . 254-*n*, . . . 254-*o*, . . . of relay switches . . . 236-*m*, . . . 236-*n*, . . . 236-*o*, . . . are coupled to the HIGH IF input ports of respective conventional modulators . . . 170-*m*, . . . 170-*n*, . . . 170-*o*, . . . which have internal IF loops. Switches . . . 236-*m*, . . . 236-*n*, . . . 236-*o*, . . . have additional output terminals . . . 237-*m*, . . . 237-*n*, . . . 237-*o*, . . . that control the internal IF switches of modulators . . . 170-*m*, . . . 170-*n*, . . . 170-*o*, . . . . When a DC control voltage is supplied by splitter 232, 232-1, . . . , switches . . . 236-*m*, . . . 236-*n*, . . . 236-*o*, . . . close and EAS IF is modulated by modulators . . . 170-*m*, . . . 17-*n*, . . . 170-*o*, . . . . One, 170-*m*, of the conventional modulators may be an "EAS designated" channel of the CATV system 214 that carries NOAA programming substantially full time. If necessary, some one or more of the output ports of the splitter 232 may be coupled to (an) input port(s) of one or more additional splitters 232-1, . . . to provide additional EAS IF sources for additional modulators . . . 170-*o*, . . . .

Figure 4:
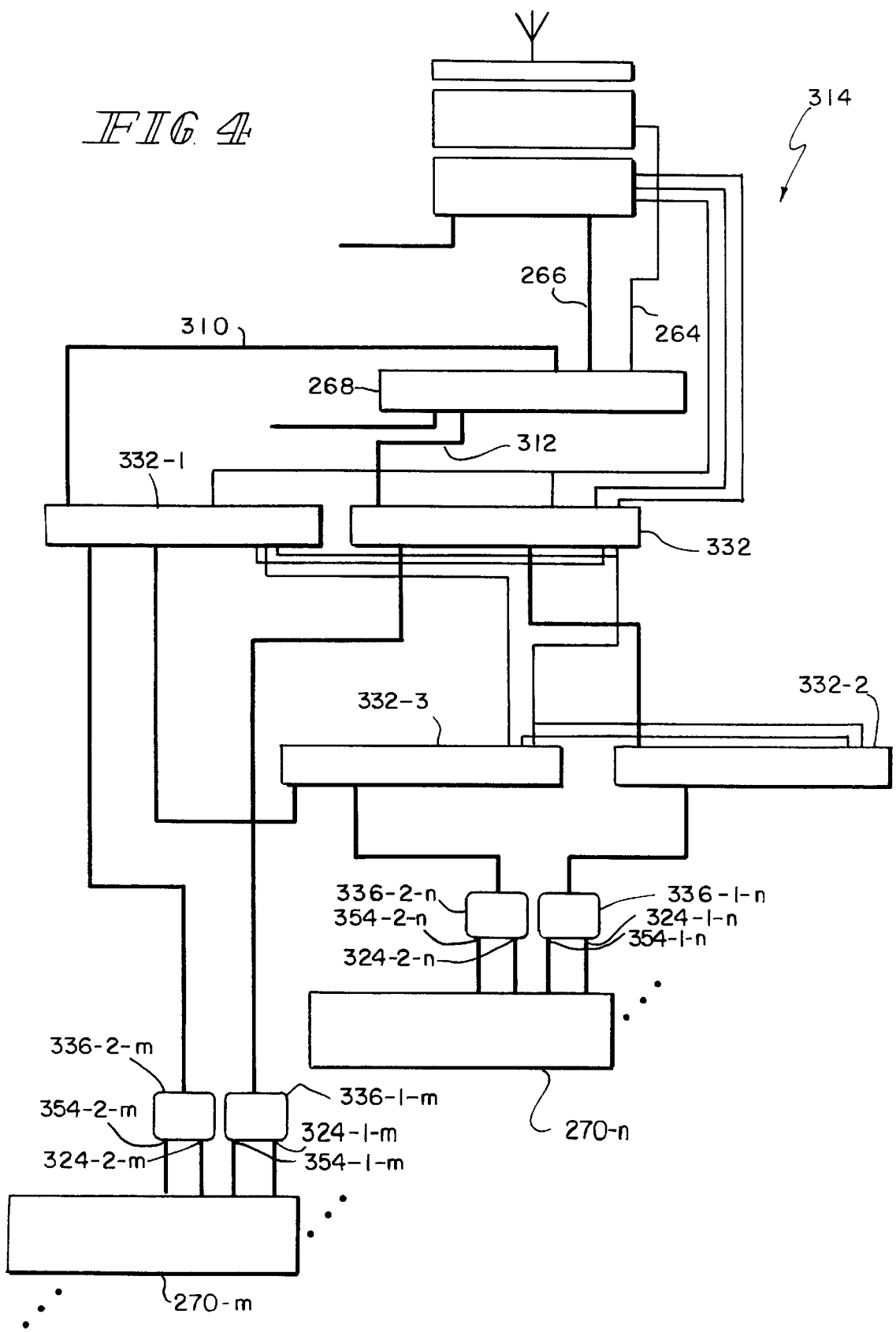
FIG. 4 illustrates a block diagram of a fragment of a CATV system head end incorporating the invention.

In another embodiment illustrated in FIG. 4, audio EAS IF and video EAS IF are separately switched to each of a number . . . 270-*m*, . . . 270-*n*, . . . of dual IF modulators. Alert station audio, typically AM and/or FM NOAA baseband audio 264, and baseband video 266 are separately provided to, and up-converted in, for example, a Trilithic model LS-2 IF modulator 268. The resulting EAS audio IF 310 and EAS video IF 312 are provided to a video IF splitter 332 and an audio IF splitter 332-1 such as, for example, Trilithic LS-16P 1-to-16 splitters. The output ports of the splitters 332 and 332-1 are coupled through, for example, suitable coax cables and connectors to normally open EAS IF input terminals of relay switches . . . 336-1-*m*, 336-2-*m*, . . . which illustratively are Trilithic model SW-1 RF switches. The normally closed terminals . . . 324-1-*m*, 354-1-*m*, 324-2-*m*, 354-2-*m*, . . . of relay switches . . . 336-1-*m*, 336-2-*m*, . . . are coupled to the IF output and IF input ports, respectively, of conventional dual IF modulators . . . 270*m*, . . . , one, 270*m*, of which may be an "EAS designated" channel of the CATV system 314 that carries NOAA programming substantially full time. If necessary, some one or more of the output ports of each splitter 332, 332-1 may be coupled to (an) input port(s) of one or more additional video IF and audio IF splitters 332-2, 332-3, to provide additional EAS audio IF and EAS video IF sources for additional dual IF modulators . . . 270*n*, . . . .

What is claimed is:

1. A communication system including a transmission channel, a relay having first and second states, an operating power port, a first signal input port, a second signal input port and a signal output port, a power supply for supplying power to the relay to place the relay alternately in the first and second states, first and second sources of program material to be selectively and alternately transmitted in the channel, the first and second sources of program material characterized by at least one program material frequency, the first signal input port of the relay coupled to the first source of program material, the signal output port of the relay coupled to the transmission channel, a first inductance for coupling the power supply to the operating power port, the relay including a second inductance for controlling the relay state, and first and second capacitances for coupling the second source of program material to the second signal input port.

2. The communication system of claim 1 wherein the first and second inductances comprise first and second inductances which provide a relatively higher impedance path to the program material frequency and a relatively lower impedance path to the power supply.

3. The communication system of claim 2 wherein the first and second capacitances comprise first and second capacitances which provide a relatively higher impedance path to the power supply and a relatively lower impedance path to the program material frequency.

4. The communication system of claim 1 wherein the first and second capacitances comprise first and second capacitances which provide a relatively higher impedance path to the power supply and a relatively lower impedance path to the program material frequency.

5. The communication system of claim 1 further comprising an at least analog switch having a main current-conducting path and first, relatively more conductive and second, relatively less conductive states, the main current-conducting path coupled in series between the power supply and the first inductance, the supply of power to the operating power port of the relay being controlled by the state of the switch.

6. The communication system of claim 5 further comprising a microcomputer coupled to the switch, the microcomputer controlling the state of the switch.

7. The communication system of claim 1 wherein the first inductance is coupled in series between the power supply and the operating power port.

8. The communication system of claim 7 wherein the first capacitance is coupled in series between the second source of program material and the operating power port of the relay.

9. The communication system of claim 8 wherein the second capacitance is coupled in series between the first capacitance and the first inductance on the one hand and the second signal input port on the other hand.

10. The communication system of claim 1 wherein the first capacitance is coupled in series between the second source of program material and the second signal input port of the relay.

11. The communication system of claim 10 wherein the second capacitance is coupled in series between the first capacitance and the second signal input port of the relay.

12. The communication system of claim 1 wherein the second capacitance is coupled in series between the second source of program material and the second signal input port.

13. The communication system of claim 1 further comprising a conductor coupled to the first inductance, the second inductance, the first capacitance, and the second capacitance, the conductor being adapted for simultaneously carrying the program material of the second program material source and the power to change the state of the relay.

14. The communication system of claim 1 wherein the second program signal is an Emergency Alert System (EAS) program signal and the first program signal is a non-EAS program signal.

15. The communication system of claim 14 wherein the EAS program signal contains EAS baseband video and separate EAS baseband audio.

16. The communication system of claim 1 further comprising a modulator having an IF loop and an output port, the output port of the modulator being coupled to the transmission channel, and the IF loop of the modulator being coupled to the first signal input port and the signal output port of the relay.

17. A communication system including a transmission channel, a plurality of relays, each relay having two states, an operating power port, a first signal input port, a second signal input port and a signal output port, a power supply for placing the relays alternately in the first and second states, the plurality of first sources of program material and single second source of program material to be selectively and alternately transmitted on the transmission channel, each of the plurality of first sources of program material and the second source of program material characterized by a respective program material frequency, the first signal input port of each relay coupled to a corresponding first source of program material, the signal output port of each relay coupled to the transmission channel, a plurality of first inductances for coupling the power supply to a corresponding operating power port, each relay including a second inductance for controlling the state of the respective relay, each second inductance coupled to the operating power port of the respective relay, a plurality of first capacitances and a plurality of second capacitances for coupling the second source of program material to the second signal input ports of the plurality of relays.

18. The communication system of claim 17 wherein the second source of program material comprises a splitter having an input port coupled to the second source of program material, the splitter splitting the program material provided by the second source of program material a plurality of times equal to the number of first sources of program material.

19. A communication system including a transmission channel, a modulator having an IF loop and a relay coupled to the IF loop, the relay having two states, the modulator having an operating power port coupled to the relay to receive power to control the state of the relay, a first signal input port coupled to the relay, a second signal input port coupled to the relay, and a signal output port coupled to the relay, a power supply for supplying power to the relay to place the relay alternately in the first and second states, first and second sources of program material to be selectively and alternately transmitted in the channel depending upon the state of the relay, the first and second sources of program material characterized by at least one program material frequency, the first signal input port coupled to the first source of program material, the modulator coupling the signal output port to the transmission channel, a conductor for coupling the second source of program material and the power supply to the modulator, a first inductance for coupling the power supply to the conductor, a second inductance for coupling the conductor to the power port of the modulator, a first capacitance for coupling the second signal input port to the conductor, and a second capacitance for coupling the second source of program material to the conductor.

20. A method for switching between first and second sources of program material to be alternately transmitted in a transmission channel, the method including providing the transmission channel, providing the first source of program material, providing the second source of program material, providing a relay having two states, an operating power port, a first signal input port, a second signal input port, and a signal output port, providing a power supply for operating the relay, coupling the first signal input port to the first source of program material, coupling the signal output port to the transmission channel, coupling the power supply through a first inductance to a second inductance included in the relay for controlling the relay state, coupling the second source of program material to the second signal input port through first and second capacitances, and supplying power to the second inductance to switch the relay from a first state in which the first source of program material is transmitted in the channel to a second state in which the second source of program material is transmitted in the channel.

21. A method for switching between a plurality of first program sources of program material and a second source of program material to be alternately transmitted in a transmission channel, the method including providing the transmission channel, providing the plurality of first sources of program material, providing the second source of program material, providing a plurality of relays, each relay having two states, an operating power port, a first signal input port, a second signal input port, and a signal output port, providing a power supply for operating the relays, coupling the first signal input ports to respective first sources of program material, coupling the signal output ports to the transmission channel, coupling the power supply through a plurality of first inductances to a respective second inductance included in each relay for controlling the respective relay state, splitting the second source of program material into a plurality of second sources of program material, coupling each of the plurality of second sources of program material to respective second signal input ports through a respective first and second capacitance, and supplying power to all of the second inductances to simultaneously switch the relays from respective first states in which the first sources of program material are transmitted in the channel to respective second states in which the second source of program material is transmitted in the channel.

* * * * *